July 3, 1923.
C. PENAFLOR
LABORATORY TABULATOR
Filed Sept. 21, 1921   4 Sheets-Sheet 3
1,460,917
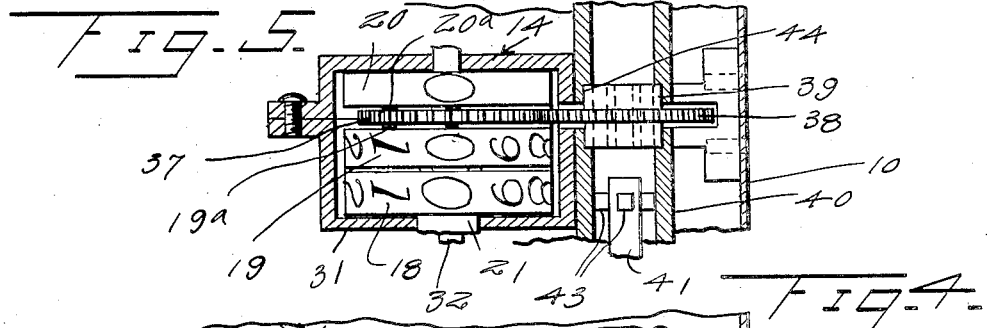
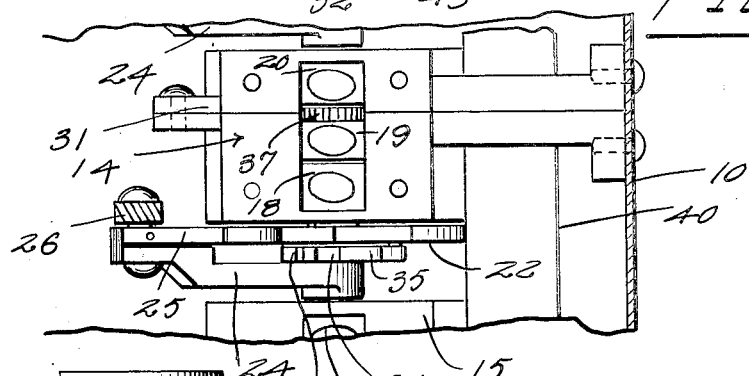
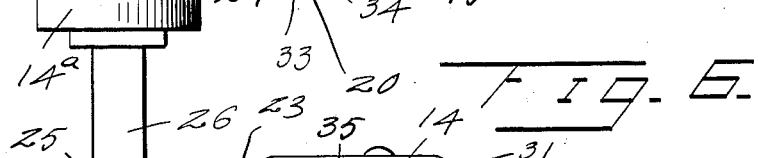
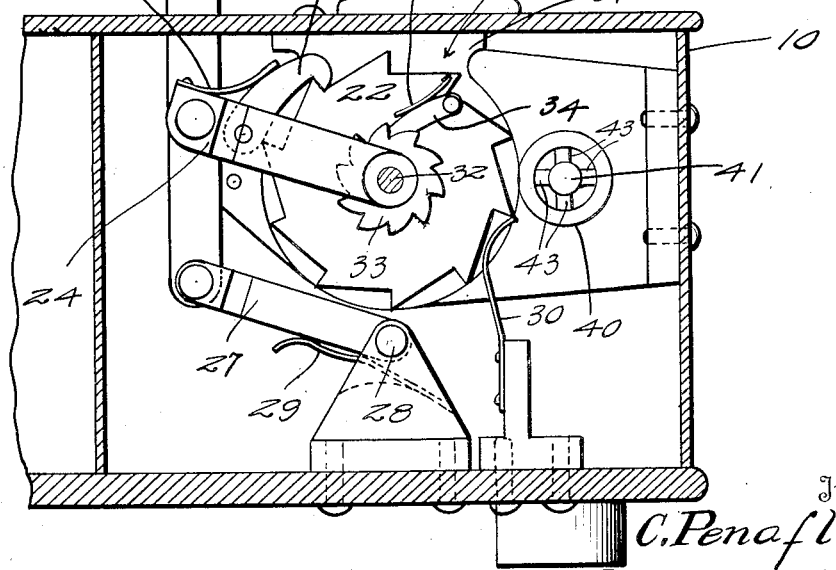
Inventor
C. Penaflor
By
Attorney July 3, 1923.
C. PENAFLOR
LABORATORY TABULATOR
Filed Sept. 21, 1921
1,460,917
4 Sheets-Sheet 4
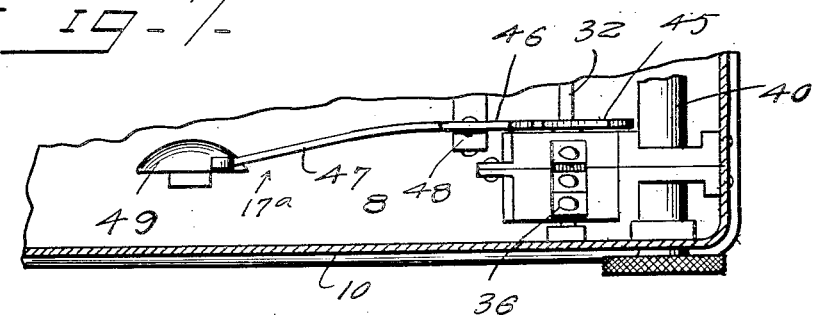
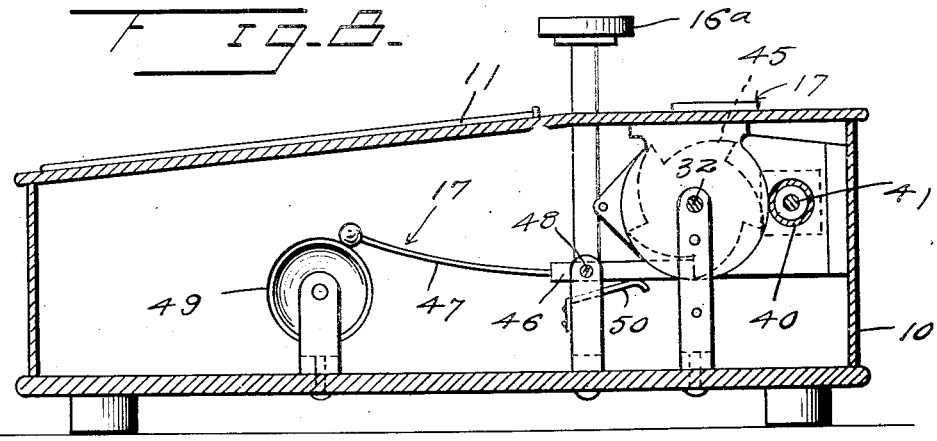
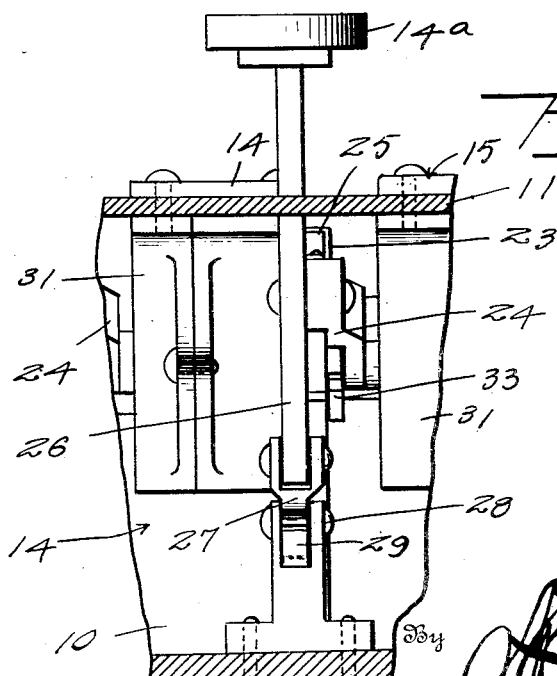
Inventor
C. Penaflor
By
Attorney Patented July 3, 1923.

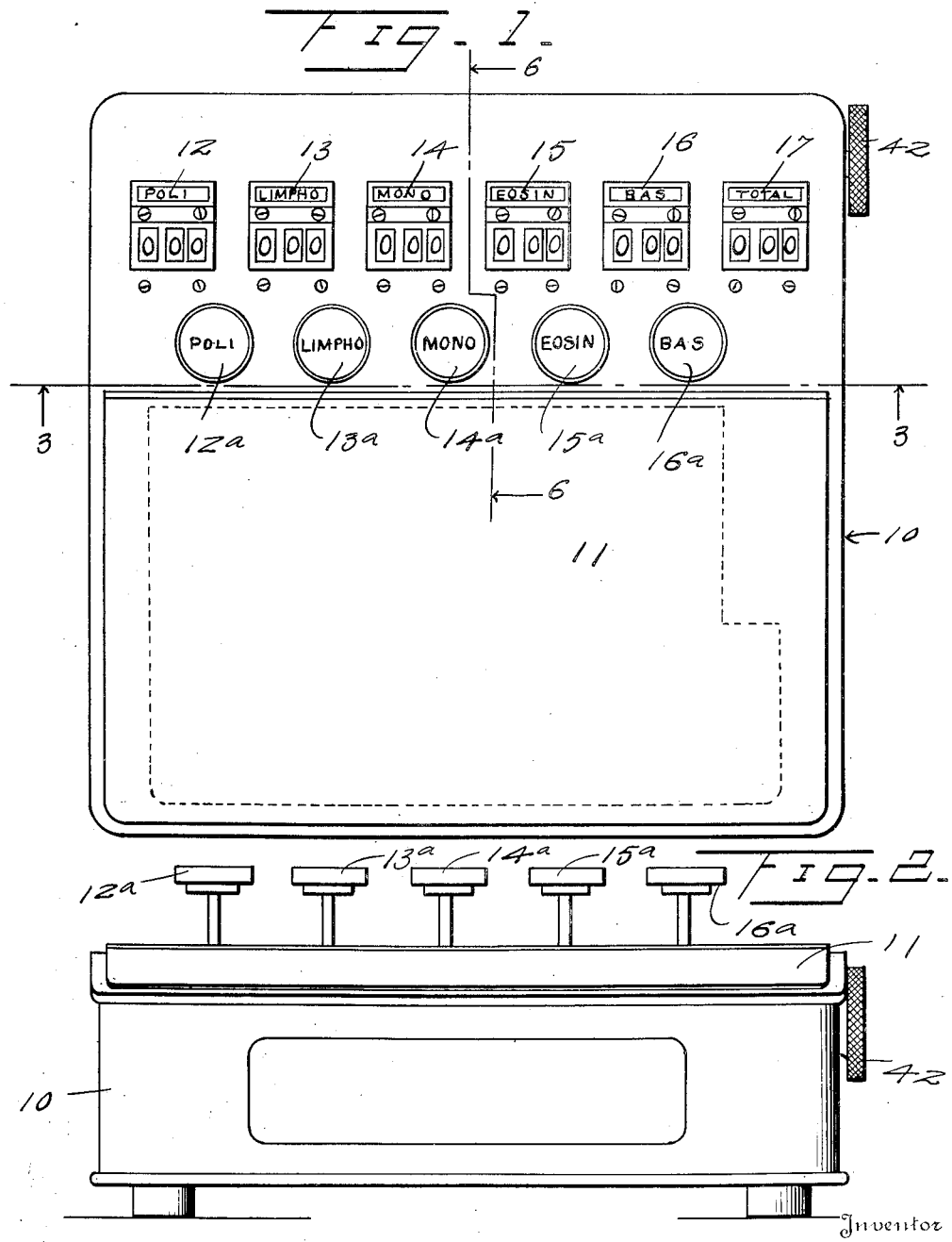

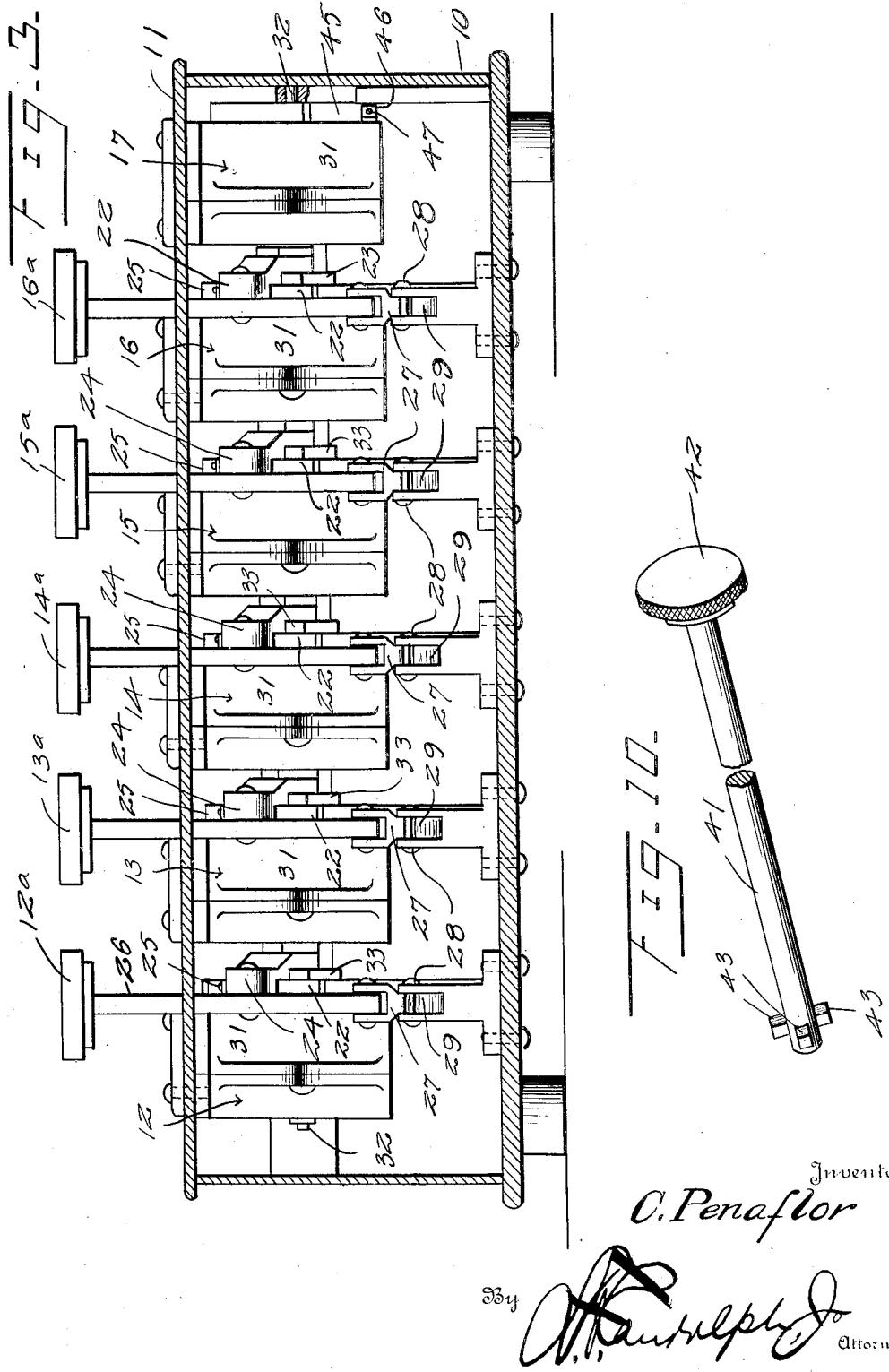

1,460,917

UNITED STATES PATENT OFFICE.

CARMELO PENAFLOR, OF MANILA, PHILIPPINE ISLANDS.

LABORATORY TABULATOR.

Application filed September 21, 1921. Serial No. 502,138.

*To all whom it may concern:*

Be it known that I, CARMELO PENAFLOR, a citizen of the United States, residing at Manila, Philippine Islands, have invented certain new and useful Improvements in a Laboratory Tabulator; and I do hereby declare the following to be a full, clear, and exact description of the invention, such as will enable others skilled in the art to which it appertains to make and use the same.

The object of the invention is to provide an apparatus for use in the differential counting of blood corpuscles in municipal, college and hospital laboratories and the like in determining the diagnosis of certain diseases, and in fact wherever accuracy and reliability are essential, as a means of enabling the investigator, while examining the blood microscopically to keep an account of the appearance of the different classes or types of corpuscles and the numbers of each without removing the eye from the microscope to make notations from time to time as in the usual practice, the objection to the common practice being that there is a continual strain upon the eye of the operator in changing from the view through the microscope to the record upon which the findings are noted in pencil or otherwise, and hence a fatigue to and disturbance of the normal functions of the eye which in large establishments where frequent examinations of this kind are required become burdensome and lead to inaccuracy and hence a failure to attain the desired object; and therefore specifically the object of the invention is to provide an apparatus by which the count may be registered by the operation of the fingers of one hand without removing the eye from the microscope and with a certainty and accuracy which cannot be attained in the ordinary way and with other advantages in the matter of securing percentages, etc. which materially facilitate the work of the diagnostician in reaching conclusions; and with these objects in view the invention consists in a construction and combination of agencies of which a preferred embodiment is illustrated in the accompanying drawing, wherein:

Figure 1 is a plan view of the apparatus.

Figure 2 is a side view of the apparatus.

Figure 3 is a section taken transversely on the plane indicated by the line 3—3 of Figure 1.

Figure 4 is a plan view of a portion of the counter-mechanism.

Figure 5 is a horizontal sectional view of the construction shown in Figure 4.

Figure 6 is a vertical section on the plane indicated by the line 6—6 of Figure 1.

Figure 7 is a plan view of a portion of the counter-mechanism at the total end of the apparatus.

Figure 8 is a vertical section showing the totalling mechanism and the signalling or alarm mechanism in side elevation.

Figure 9 is an enlarged front elevation showing a portion of the counter mechanism, and Figure 10 is a detail perspective view of the resetting spindle.

A suitable casing 10 having an upper surface 11 suitable to form an arm or wrist rest for the hand of the operator serves as a housing for a plurality of counter-mechanisms which in the construction illustrated are respectively designated as 12, 13, 14 15 and 16, with which are related the operating keys 12$^a$ and 16$^a$ inclusive, to a totalling counter-mechanism 17.

These keys, of which five are shown in the drawing, any suitable number may be employed, and are respectively designated distinguishably by such abbreviations representing different characters or conditions of corpuscles as "poli," "limpho," "mono," etc. are adapted to be actuated by the fingers of the hand of the operator devoted to this work while examining the specimen of blood through the microscope, the operation of each key being registered on the corresponding counter-mechanism which is correspondingly designated as shown, each operation of either of the keys being represented by an addition to the count on the total counter mechanism and the latter being operatively connected with a signalling or alarm mechanism indicated generally at 17$^a$ to indicate to the operator when a composite count represented by the successive operations of either or all of the keys has aggregated one hundred or any multiple of one hundred up to five hundred, so that by comparing the count registered on either of the counter-mechanism from 12 to 16 with that indicated on the total counter-mechanism, the percentage of corpuscles of the particular character represented by the first named counter-mechanism will be indicated at a glance, The several counter-mechanisms, exclusive of the total counter-mechanism are of the same construction and therefore a particular description of one of them will suffice for all, and as illustrated the same consists of units, tens and hundreds disks 18, 19 and 20 loosely mounted upon a tubular shaft 21 and peripherally bearing numerals from zero to nine inclusive, the units disk having a number of ratchet teeth 22 corresponding to the numerical designations and being actuable by a pawl 23 arranged in operative relation with the ratchet teeth thereof. Said pawl is carried by a link 24 mounted concentric with the tubular shaft 21 and connected with the stem of the corresponding key, and said pawl is yieldingly held in engaging relation with the ratchet by a spring 25. The lower end of the stem 26 of the key is connected with a second link 27 having a fulcrum 28 and is actuable to return the key by a spring 29 or any equivalent thereof. The units disk is held at its successive adjustments due to the forward step-by-step movement under the actuation of the key by means of a retaining pawl 30 and motion is communicated from each disk of the counter by the usual or any preferred type of transfer mechanism common in counters of this general class, operating on the metric principle and where one complete revolution of the disk of lower denomination causes a one step forward of the disk of next higher denomination.

Extending axially through the hollow shafts 21 of the several counter mechanisms, the disks of each of which are mounted in suitable casings 31 secured in the construction illustrated to the top or upper wall of the casing 10, is a total spindle 32, extending throughout the length of the casing and carrying, for each counter-mechanism, a ratchet wheel 33 with which cooperates a pawl 34 having an actuating spring 35 so that for each forward step of the units disk of each counter mechanism the spindle 32 receives a corresponding forward movement, and to this spindle is attached the units disk 36 of the total counter mechanism from which motion is communicated to the disks of higher denominations as indicated with reference to the other counter mechanism to the end that when either of the counter mechanisms is actuated by the operation of its key, the spindle 32 and hence the units disk of the total counter mechanism are correspondingly advanced to the end that the total counter mechanism registers the total number of actuations of all of the keys and by comparison as above noted of the registered number on either counter mechanism with that of the total counter-mechanism, a direct determination of percentage can be reached.

To provide for resetting or returning the parts to their normal positions after the completion of an operation involving the counting of the corpuscles in any given specimen, gears 37 are arranged between the tens and hundreds disks of each counter mechanism, and meshing with each of the gears is an assembling gear 38 having a hub 39 revolubly mounted in a guide 40 extending parallel with the series of counter mechanisms to direct the movements of a resetting spindle 41 to the outer end of which is attached a knob 42 exposed at one end of the casing as shown in Figures 1 and 2. The resetting spindle is provided with a radially armed head 43 while the hub of each assembling gear is provided with a seat 44 corresponding with the head to the end that an interlocking engagement may be effected between the resetting spindle and each assembling gear to permit of the turning of either of the latter by means of the former The seats 44 extend completely through the hubs of the assembling gears so that by means of the exposed button 42 the resetting spindle may be engaged with the assembling gear of either of the counter mechanisms. When an engagement of the head of the resetting spindle with a seat in an assembling gear has been effected, the turning of the spindle, to facilitate which the button 42 is peripherally milled, will cause a corresponding rotation of the meshing gear 37 which is provided with pins $19^a$ and $20^a$ for engaging corresponding pins on the tens and hundreds disks to restore them to their normal initial or zero positions. The units disk of the corresponding counter may be restored to its zero position by the operation of the key.

In order that the operator may be advised when the total number of actuations of the operating keys has aggregated one hundred or a multiple of one hundred the hundreds disk of the total counter consists of a five tooth ratchet 45 actuable by the tens disk of the said counter mechanism, and in operative relation with the teeth of said ratchet is the arm 46 of a hammer 47 pivoted at 48 and adapted to strike a gong or bell 49. Said hammer is actuated by means of a spring 50. The teeth of the ratchet 45 are disposed at a distance to regster each complete revolution of the tens disk of the total register, so that while the operator is notified at the end of each one hundred operations of the keys, he is enabled to proceed with the count up to five hundred where the task of determining a percentage necessitates carrying the count into multiples of one hundred.

While the preferred embodiment of this invention is shown and described it will be understood that minor changes in the details of construction and arrangement of parts may be resorted to within the scope of what is claimed without departing from the spirit of the invention.

Having thus described the invention, what I claim is:—

1. A tabulator including a casing, a spindle therein, cooperating registering disks journaled on said spindle, a ratchet wheel movable with one of said disks and located exteriorly of the casing, a depressible operating member, a link extending from said operating member and pivoted on said spindle, a pawl extending upwardly from said link and engaging said ratchet, a spring on said link engaging said pawl and urging it into relation with the ratchet wheel, a link extending from said operating member below and substantially parallel to the first link to which the second link is pivoted rising from the base of the casing below said ratchet wheel, said means having a recess, a return spring disposed in said recess and engaging the second mentioned link, a retaining pawl for said ratchet wheel relatively close to said means, a registering mechanism for totals operated by said spindles, a ratchet wheel on said spindle, and a pawl carried by the first mentioned ratchet wheel and cooperating with the second mentioned ratchet wheel.

In testimony whereof I affix my signature in presence of two witnesses.

CARMELO PENAFLOR.

Witnesses:
 José Sabella, M. D.,
 Antonio Hernandez, M. D.